United States Patent
Daugherty (10) Patent No.: US 7,153,431 B2
(45) Date of Patent: Dec. 26, 2006

(54) METHOD AND SYSTEM FOR UTILIZING ACTIVATED SLUDGE IN A BALLASTED FLOCCULATION PROCESS TO REMOVE BOD AND SUSPENDED SOLIDS

(75) Inventor: James Scott Daugherty, Cary, NC (US)

(73) Assignee: I. Kruger Inc., Cary, NC (US)

( * ) Notice: Subject to any disclaimer, the term of this patent is extended or adjusted under 35 U.S.C. 154(b) by 123 days.

(21) Appl. No.: 11/086,849

(22) Filed: Mar. 22, 2005

(65) Prior Publication Data

US 2006/0213832 A1    Sep. 28, 2006

(51) Int. Cl.
*C02F 3/00*    (2006.01)
(52) U.S. Cl. .................. 210/622; 210/624; 210/625; 210/195.1; 210/196; 210/197
(58) Field of Classification Search ............ 210/195.1, 210/196, 197, 624, 625, 622
See application file for complete search history.

(56) References Cited

U.S. PATENT DOCUMENTS

| | | | |
|---|---|---|---|
| 5,137,636 A | 8/1992 | Bundgaard | |
| 5,536,407 A | 7/1996 | Petersen | |
| 5,650,069 A | 7/1997 | Hong et al. | |
| 5,908,554 A | 6/1999 | Tholander et al. | |
| 6,277,285 B1 * | 8/2001 | Vion | 210/709 |
| 6,290,849 B1 | 9/2004 | Rykaer et al. | |

FOREIGN PATENT DOCUMENTS

FR    2 719 235    5/1994

\* cited by examiner

*Primary Examiner*—Chester T. Barry
(74) *Attorney, Agent, or Firm*—Coats & Bennett, P.L.L.C.

(57) ABSTRACT

A method and system for treating water or wastewater to remove both soluble BOD and suspended solids. The method entails a ballasted flocculation process where a flocculant and insoluble granular material is added to the water or wastewater to be treated causing solids in the water or wastewater to aggregate around the granular material to form ballasted floc particles. In a settling zone, ballasted floc particles form settled sludge and the settled sludge is separated from clarified effluent. At some point in the process, activated sludge, in the form of return activated sludge or mixed liquor, is mixed with the water or wastewater being subjected to the ballasted flocculation process. The addition of activated sludge enables the process to remove soluble BOD.

12 Claims, 4 Drawing Sheets

METHOD AND SYSTEM FOR UTILIZING ACTIVATED SLUDGE IN A BALLASTED FLOCCULATION PROCESS TO REMOVE BOD AND SUSPENDED SOLIDS

FIELD OF THE INVENTION

The present invention relates to the treatment of water or wastewater, and more particularly to a combination activated sludge—ballasted flocculation process that is effective to remove both BOD and suspended solids.

BACKGROUND OF THE INVENTION

Water and wastewater treatment processes sometimes use ballasted flocculation to clarify water or wastewater. A ballasted flocculation process allows for faster settling of the flocculated material that is formed in the process. The faster settling of the ballasted floc allows for very high overflow rates in the clarifier or settling tank, and therefore allows the footprint of the total treatment system to be significantly smaller than conventional clarifiers. Furthermore, compared to other conventional clarification systems, start-up and optimation times for ballasted flocculation systems are generally shorter due to the decreased hydraulic retention times of the system.

Ballasted flocculation treatment systems employ a physical/chemical process and remove mostly particulate and colloidal solids present in the raw water or wastewater stream. Due to the physical/chemical nature of the solids removed, often times the process does not remove dissolved constituents. Of particular interest in treating water or wastewater is soluble BOD. Soluble BOD and particulate BOD are components of total BOD. While ballasted flocculation processes may achieve greater than 85% particulate BOD removal, these processes do not efficiently remove soluble BOD.

Therefore, there has been and continues to be a need for a ballasted flocculation system that will effectively remove soluble BOD.

BRIEF SUMMARY OF THE INVENTION

The present invention relates to a water or wastewater treatment system and process that includes both an activated sludge system and a ballasted flocculation system. The water or wastewater treatment system includes one or more connecting lines that extend between the activated sludge system and the ballasted flocculation system. Activated sludge in the form of mixed liquor or return activated sludge is directed from the activated sludge system to the ballasted flocculation system. Hence, the total system is effective to remove BOD, including soluble BOD, and suspended solids.

In one particular embodiment, water or wastewater is directed into an activated sludge system and mixed with return activated sludge in a reactor to form mixed liquor. At least a portion of the mixed liquor of the activated sludge system, or at least a portion of the return activated sludge of the activated sludge system, is directed to and through a ballasted flocculation system. Hence, soluble BOD is removed from the water or wastewater by the activated sludge while suspended solids are removed from the water or wastewater by the ballasted flocculation system.

In another embodiment, an activated sludge system and a ballasted flocculation system are operated in parallel. A first water or wastewater influent stream is directed into the activated sludge system. A second water or wastewater stream is directed into the ballasted flocculation system. However, activated sludge in the form of mixed liquor or return activated sludge is directed from the activated sludge system to a mixing chamber that receives the second water or wastewater stream. Here, the water or wastewater is mixed with the mixed liquor or return activated sludge to form mixed liquor that is directed from the mixing chamber through the ballasted flocculation system. Hence, soluble BOD in the second water or wastewater stream is removed by the activity of the activated sludge and suspended solids and other particulate contaminants are removed from the same water or wastewater stream by the ballasted flocculation process.

Other objects and advantages of the present invention will become apparent and obvious from a study of the following description and the accompanying drawings which are merely illustrative of such invention.

DESCRIPTION OF EXEMPLARY PROCESSES AND SYSTEMS

The present invention entails a ballasted flocculation process for treating water or wastewater where activated sludge is mixed with water or wastewater to be treated such that BOD, including soluble BOD, is removed as well as suspended solids. As used herein, the terms water and wastewater are interchangeable and the use of either term is intended to encompass the other.

Before reviewing the processes and systems shown in FIGS. 1–4, it may be beneficial to briefly review ballasted flocculation. A ballasted flocculation process generally entails a chemical and physical process where contaminants such as suspended solids aggregate around insoluble granular materials such as microsand to form ballasted floc particles. Through a settling process, the ballasted floc particles comprised of sand, suspended solids, and other contaminants are settled in a settling tank, producing a separated, clarified effluent. The settled sludge, including the granular material as well as solids and other contaminants, is directed to a separator which separates the granular material from the sludge. In most cases, the separated granular material is recycled back through the ballasted flocculation process. As will be appreciated from subsequent discussion, the separated sludge can be recycled to an activated sludge system or can simply be discharged and subsequently treated.

Figure 1:
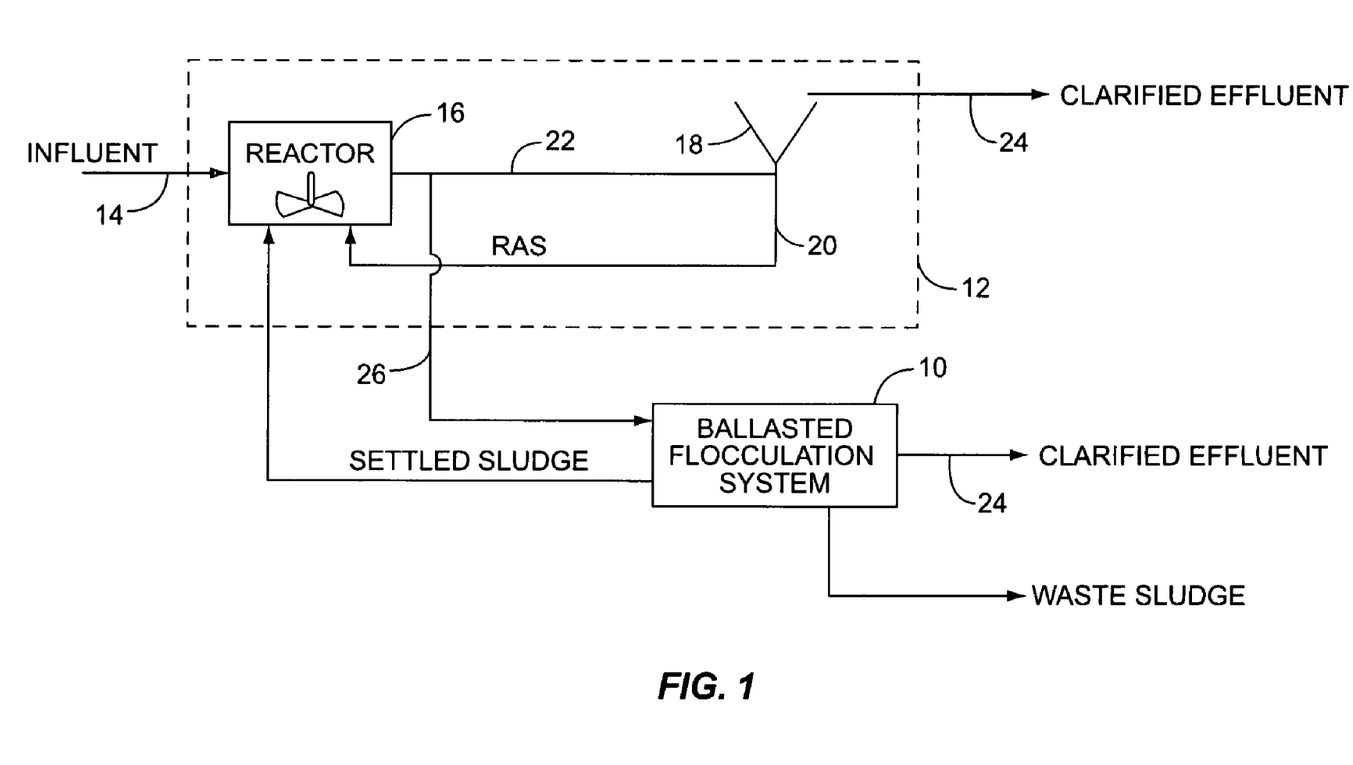
FIG. 1 is a schematic illustration of one process embodiment that utilizes ballasted flocculation and activated sludge to treat water or wastewater.

Turning to FIG. 1, there is shown therein a combined activated sludge system, indicated generally by the numeral 12, and a ballasted flocculation system 10. As will be appreciated from subsequent portions of the disclosure, activated sludge is transferred from the activated sludge system 12 to the ballasted flocculation system 10.

More particularly, and with respect to FIG. 1, the activated sludge system 12 includes an influent line 14 that is operative to direct water or wastewater to be treated into a reactor 16. Downstream from the reactor 16 is a clarifier 18. A return activated sludge (RAS) line 20 extends from the clarifier 18 back to the reactor 16. A line 22 extends from the reactor 16 to the clarifier 18. Clarifier 18 includes an outlet line 24 for directing clarified effluent from the clarifier 18.

Activated sludge system 12 can be designed to operate under aerobic, anoxic, and anaerobic conditions, or a combination of any one of these three basic activated sludge process conditions. Reactor 16 would typically include one or more mixers and could be provided with other means for aerating the contents thereof. Various types of mixers or aerators can be used to mix and/or aerate the mixed liquor in reactor 16. Typically, water or wastewater is directed into the reactor 16 and mixed with return activated sludge that is transferred from the bottom of clarifier 18 to the reactor 16 through line 20. Together, the water or wastewater influent and return activated sludge form what is sometimes referred to as mixed liquor within reactor 16 is held therein a selected time period and, as noted above, can be mixed, and in the case of an aerobic process subjected to aeration. The mixed liquor in reactor 16 is directed through line 22 to the clarifier 18 where activated sludge settles to the bottom of the clarifier 18 and is eventually directed back to the reactor 16 via line 20. In conventional fashion, a portion of the return activated sludge can be wasted. Clarified effluent is directed from the clarifier via line 24.

As seen in FIG. 1, the treatment system also includes a ballasted flocculation system 10. Line 26 is communicably connected between line 22 and the ballasted flocculation system 10. Hence, a portion of the mixed liquor passing from the reactor 16 is directed through line 26 into and through the ballasted flocculation process 10. In a preferred process, the other portion of the mixed liquor passing in line 22 is directed to the clarifier 18. The mixed liquor passing to the ballasted flocculation system 10 via line 26 is subjected to a ballasted flocculation process. As discussed above, in a typical ballasted flocculation process, a coagulant, flocculant and insoluble granular material is mixed with the water or wastewater which in this case is in the form of a mixed liquor. Through a settling process in the ballasted flocculation system, the ballasted floc particles comprised of sand, suspended solids and other contaminants are settled. Because the water or wastewater that entered influent line 14 has been subjected to an activated sludge process and a ballasted flocculation process, it follows that the activated sludge will have the effect of removing soluble BOD from the water or wastewater and the clarifier 18 along with the ballasted flocculation system 10 will effectively clarify or remove suspended solids and other contaminants from the mixed liquor passing therethrough.

In the case of the embodiment illustrated in FIG. 1, the ballasted flocculation system 10 functions as a clarifier. That is, both the clarifier 18 forming a part of the activated sludge system 12, and the ballasted flocculation system 10 perform a clarification function. Indeed, both clarifier 18 and the ballasted flocculation system 10 function in parallel to clarify the water or wastewater that enters the activated sludge system through influent line 14.

There are numerous applications for the general system shown in FIG. 1. In the way of an example, conventional activated sludge systems such as that shown in FIG. 1 can be expanded to have increased capacity by adding the ballasted flocculation system 10. In some activated sludge systems, clarification of the water or wastewater is the limiting process. Hence, additional clarification capacity can be added, cost effectively, to an existing activated sludge system by adding a ballasted flocculation system such as illustrated in FIG. 1.

Figure 2:
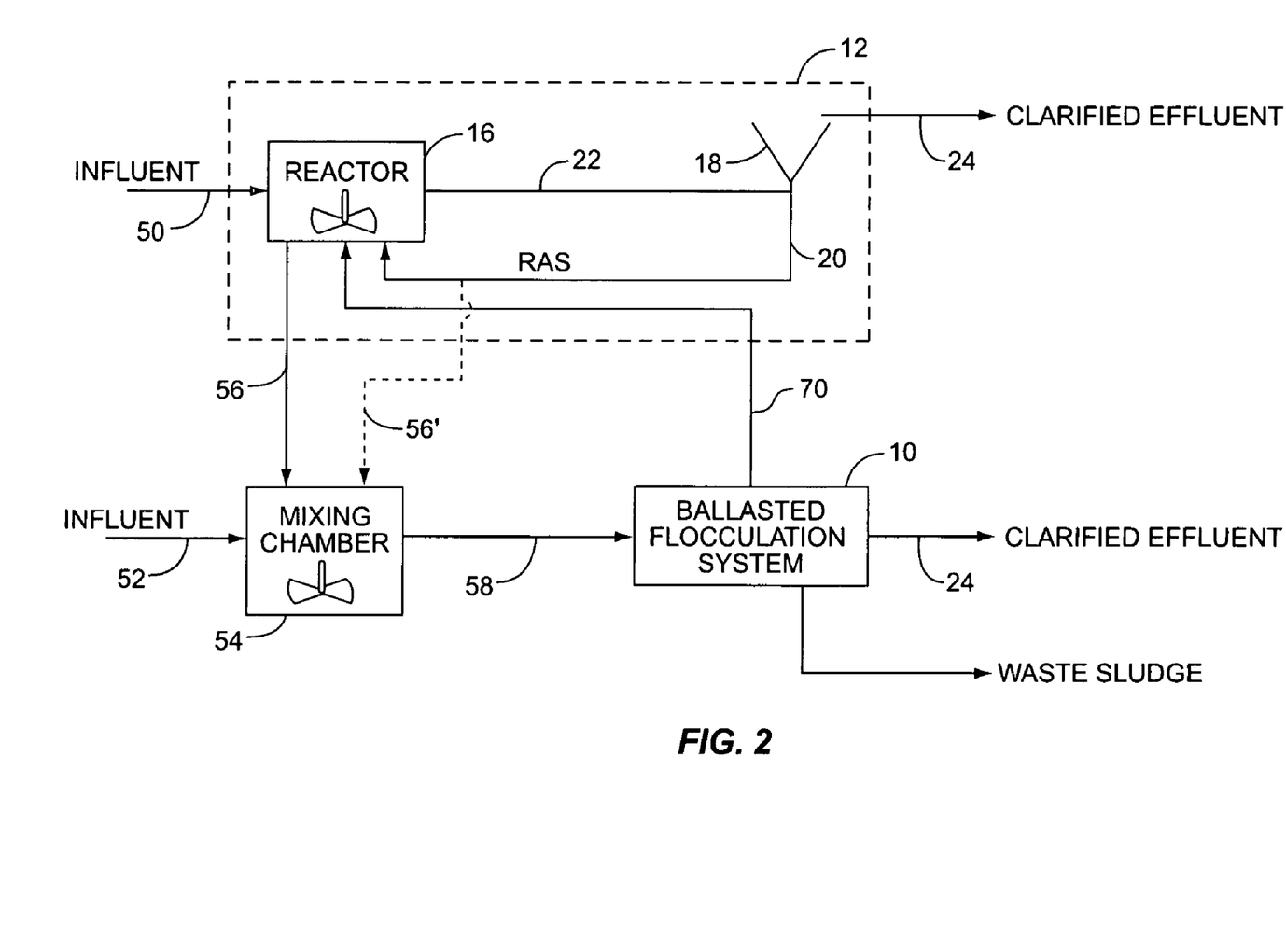
FIG. 2 is a schematic illustration of a second process embodiment that employs ballasted flocculation and activated sludge to treat water or wastewater.

Turning to FIG. 2, another system or process is disclosed that involves treating water or wastewater with activated sludge and a ballasted flocculation process. The system disclosed in FIG. 2 comprises an activated sludge system 12 and a ballasted flocculation system 10. In this case, there are two influent lines, line 50 and 52. Influent line 50 is directed into the activated sludge system 12 while influent line 52 is directed to a mixing chamber 54 and then to the ballasted flocculation system 10. A line 56 extends from the reactor 16 of the activated sludge system 12 to the mixing chamber 54. Mixing chamber 54 would typically be provided with a mixer for mixing the influent water or wastewater with the mixed liquor from the reactor 16. In addition, conventional aeration means can be provided in the mixing chamber 54 to aerate the mixed liquor therein. A line 58 extends between the mixing chamber 54 and the ballasted flocculation system 10. Hence, mixed liquor contained in mixing chamber 54 is directed to the ballasted flocculation system 10.

In the FIG. 2 embodiment, it is seen that the system disclosed therein is effective to simultaneously treat two separate influent streams. Water or wastewater entering influent line 50 is treated through a conventional activated sludge process and produces a clarified effluent via line 24 that leads from the clarifier 18. Water or wastewater entering influent line 52 is treated in the mixing chamber 54 as well as by the ballasted flocculation system 10. Activated sludge in the form of return activated sludge (RAS) or mixed liquor can be utilized and mixed with the influent in the mixing chamber 54. Herein, the term activated sludge is meant to encompass return activated sludge (RAS) or concentrated activated sludge such as the type that is typically returned from the clarifier 18 to the reactor 16 in an activated sludge process. Further, the term activated sludge encompasses mixed liquor which is formed by mixing water or wastewater influent with the return activated sludge. In both cases, the important point is that activated sludge, whether concentrated or diluted, is being utilized in a process that directly or indirectly involves a ballasted flocculation process.

Figure 3:
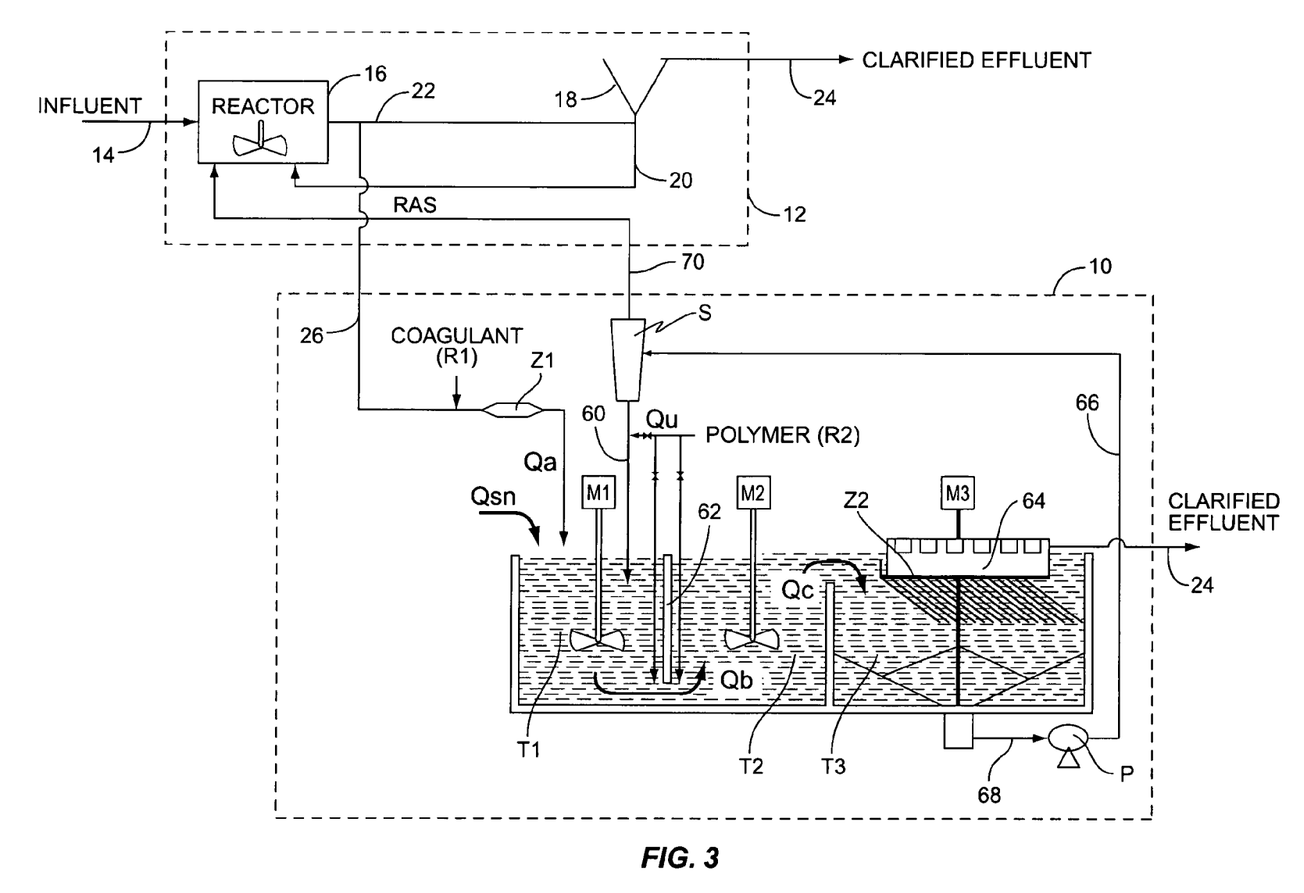
FIG. 3 is another schematic illustration that is similar to the FIG. 1 process, of a process that utilizes ballasted flocculation and activated sludge to treat water or wastewater.

Turning to FIG. 3, there is shown a system and process that is similar to the system and process shown in FIG. 1, but wherein the ballasted flocculation system 10 is shown in more detail. Mixed liquor from reactor 16 is directed to the ballasted flocculation system 10 via line 26. Various controls can be exercised in line 26. For example, pH and turbidity can be sensed and monitored. In any event, the mixed liquor traveling in line 26 to the ballasted flocculation system 10 is subjected to a ballasted flocculation process. A coagulant R1 is added in line 26 or at some point in the ballasted flocculation system. An in-line mixer Z1 (which is optional) is operative to mix the coagulant R1 with the mixed liquor. In some cases, the ballasted flocculation system 10 may include a separate coagulation tank with a mixer for mixing the coagulant with the water, wastewater, or mixed liquor. Coagulant R1 may comprise various compositions such as aluminum sulfate and ferric chloride. Dosages of coagulant R1 can vary greatly based on the conditions of the mixed liquor.

For purposes of reference, the mixed liquor passing in line 26 to the ballasted flocculation system 10 is referred to as Qa. Flow Qa is directed into the ballasted flocculation system 10 and in particular to injection tank T1. Injection tank T1 includes a mixer M1. Disposed adjacent or over injection tank T1 is a hydrocyclone S. Hydrocyclone S is a conventional apparatus that is used in water and wastewater treatment to separate insoluble granular material (microsand) from sludge or floc surrounding the granular material.

As illustrated in FIG. 3, a feed line 60 extends down from the hydrocyclone S. Insoluble granular material is directed down the feed line 60 into the injection tank T1. Also communicably connected to the feed line 60 is a flocculant line for injecting a reactant such as a polymer into either the injection tank T1 or an adjacent disposed maturation tank T2. Polymer R2 can comprise various compositions. An example of an appropriate polymer is polyacrylamide polymer. Dosages of this polymer are generally less than 2.0 mg/l for wastewater treatment. However, these dosages can also vary based on the conditions of the mixed liquor and local regulations. Maturation tank T2 is separated from injection tank T1 by a partial partition or wall 62. Note that wall 62 includes a lower opening that permits flow from injection tank T1 to maturation tank T2. Flow passing under the partition wall 18 is referred to as flow Qb.

Disposed in maturation tank T2 is a mixer M2. As illustrated in FIG. 3, polymer R2, which is a flocculant, can be injected into the injection tank T1 or the maturation tank T2. Note that the flocculant injection lines extend down each side of the partition wall 18 enabling the flocculant to be injected on either side thereof. Further, as noted above, the flocculant in the form of polymer R2 can be combined with the insoluble granular material, such as microsand, and fed into the injection tank T1 via the feed line 60.

Disposed adjacent maturation tank T2 is a settling tank T3. Settling tank T3 includes a surrounding wall structure. Lamella Z2 in the form of plates or tubes is optional. Disposed above the lamella Z2 is a collection trough 64 which can be optional. Settling tank T3 includes a settling tank scraper M3. As illustrated in FIG. 3, the flow passing from the maturation tank T2 to the settling tank T3 is referred to as flow Qc.

Settling tank T3 is designed or adapted to collect or receive settled sludge about the bottom thereof. This settled sludge about a central portion of the settling tank T3 and directed through line 68 to a pump P. As will be appreciated from subsequent portions of the disclosure, the settled sludge collected in settling tank T3 and conveyed by pump P includes the insoluble granular material with floc aggregated around the granular material. This settled sludge is pumped from pump P through lines 66 to the hydrocyclone S. There, the insoluble granular material, which is typically microsand, is separated from the sludge and recycled through the process via feed line 60. Hydrocyclone S separates the sludge which includes solids and directs the separated sludge into line 70. Line 70 can extend to the activated sludge system 12 and particularly the reactor 16. Hence the settled sludge produced by the ballasted flocculation system 10 can be recycled to the reactor 16. In some cases, the settled sludge separated by the hydrocyclone S can be directed from the wastewater treatment system for further treatment.

Therefore, in the case of the system and method illustrated in FIG. 3, influent water/wastewater is directed into the activated sludge system 12 via line 14. Mixed liquor formed in the reactor 16 is directed through line 26 into and through the ballasted flocculation system 10. Hence the mixed liquor is treated with the activated sludge and this treatment is, in conventional fashion, effective to reduce the soluble BOD in the influent water or wastewater. Further, the ballasted flocculation system 10 along with the clarifier 18 is effective to clarify the mixed liquor formed in the reactor 16.

In a process such as illustrated in FIG. 3, it is contemplated that the ballasted flocculation system 10 would be effective to remove approximately 90% to 100% of the total suspended solids (TSS) in the mixed liquor. In pilot studies conducted based on a primary influent into the activated sludge system of approximately 90–100 GPM, it was found that the mixed liquor suspended solid (MLSS) was approximately 2,000–3,000 mg/L. The test indicated that the TSS of the effluent from the ballasted flocculation process was approximately 0–4 mg/l.

Figure 4:
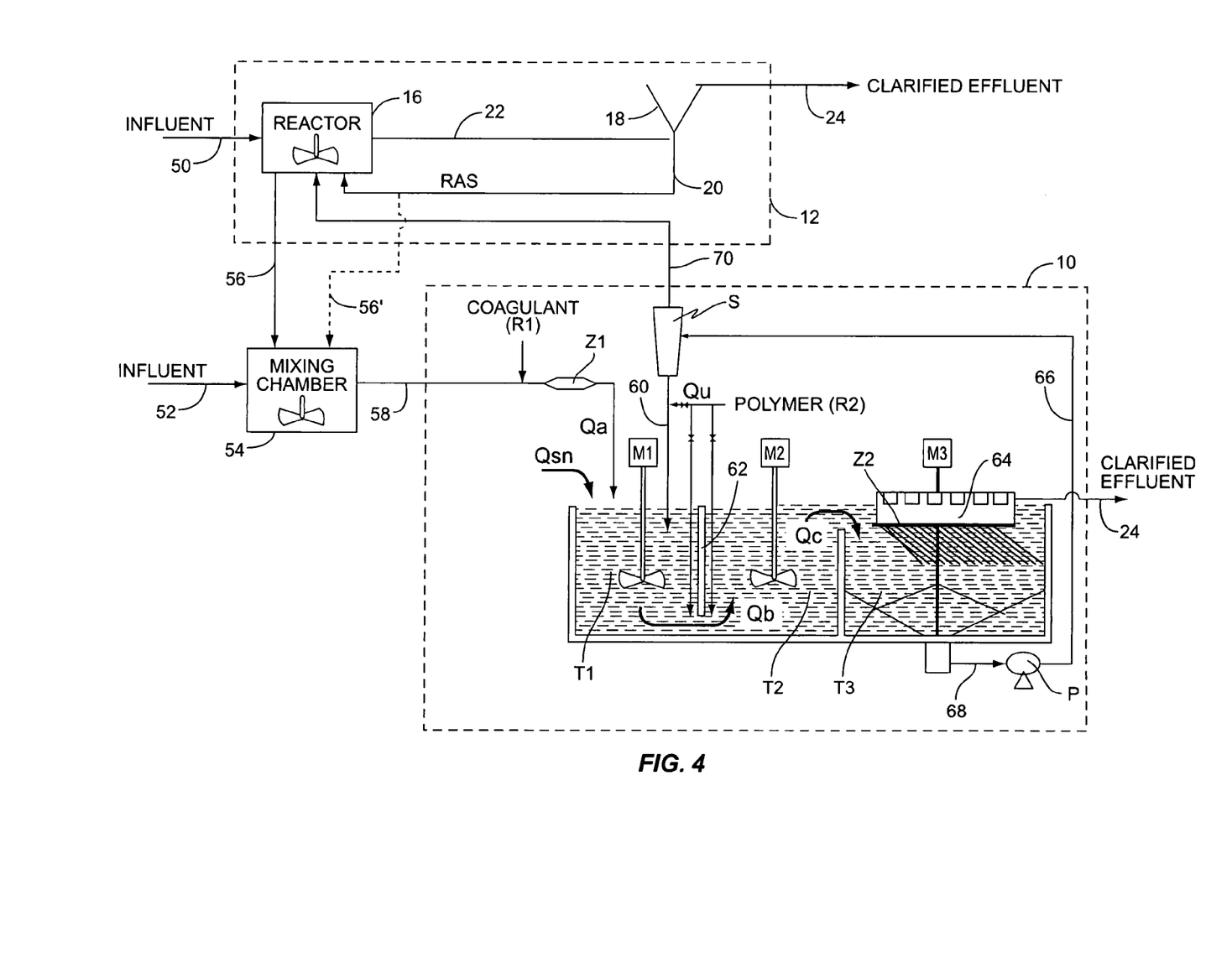
FIG. 4 is another schematic illustration, similar to the FIG. 2 process, that utilizes ballasted flocculation and activated sludge to treat water or wastewater.

Turning to FIG. 4, the process therein is similar to that illustrated in FIG. 2 but with the ballasted flocculation system expanded to show the individual components and processes thereof. Here, either mixed liquor from the reactor 16 is directed via line 56 to the mixing chamber 54, or in the alternative return activated sludge passing in line 20 is directed through line 56' to the mixing chamber 54 where the same is mixed with water or wastewater influent entering through line 52. In any event, whether mixed liquor or return activated sludge is directed to mixing chamber 54, the chamber is provided with a mixer or some other form of mixing for mixing the same with water or wastewater influent and hence forms mixed liquor in chamber 54. This mixed liquor in chamber 54 is directed through the ballasted flocculation system 10 just described above.

It is contemplated that the soluble BOD present in the clarified effluent leaving the ballasted flocculation system 10 will be approximately 50% of the soluble BOD present in the influent entering line 52.

In tables 1, 2, 3, 4, 5, and 6, there is provided pilot test studies for a system and process similar to the FIG. 4 that indicate the removal rate for total and soluble BOD as well as soluble COD and TSS. The tables show various test results where the MLSS concentration of the mixed liquor directed into the mixing chamber 54 varied, and where the contact time in the mixing chamber 54 varied.

TABLE 1

Composite Sample Testing 800 MLSS @ 30 Min. Contact Time

| Day | *Time | Total BOD (mg/l) | | | Soluble BOD (mg/l) | | | Soluble COD (mg/l) | | | TSS (mg/l) | | |
|---|---|---|---|---|---|---|---|---|---|---|---|---|---|
| | | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 41.8 | 6.6 | 84.1 | 7.6 | 2.7 | 65.2 | 45.0 | 13.0 | 71.1 | 79.0 | 5.0 | 93.7 |
| | PM | 41.9 | 5.6 | 86.6 | 9.3 | 2.6 | 72.5 | 48.0 | 14.0 | 70.8 | 75.0 | 5.0 | 93.3 |

TABLE 1-continued

Composite Sample Testing 800 MLSS @ 30 Min. Contact Time

| | | Total BOD (mg/l) | | | Soluble BOD(mg/l) | | | Soluble COD(mg/l) | | | TSS (mg/l) | | |
|---|---|---|---|---|---|---|---|---|---|---|---|---|---|
| Day | *Time | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 2 | AM | 67.8 | 6.4 | 90.5 | 24.8 | 3.5 | 85.7 | 68.0 | 11.0 | 83.8 | 58.0 | 6.0 | 89.7 |
|   | PM | 129.6 | 35.2 | 72.9 | 69.2 | 30.3 | 56.3 | 133.0 | 50.0 | 62.4 | 74.0 | 9.0 | 87.8 |
| 3 | AM | 59.2 | 7.1 | 88.0 | 11.5 | 4.4 | 62.1 | 60.0 | 12.0 | 80.0 | 80.0 | 7.0 | 91.3 |
|   | PM | 56.3 | 7.9 | 85.9 | 10.7 | 4.7 | 56.5 | 61.0 | 17.0 | 72.1 | 74.0 | 8.0 | 89.2 |
| 4 | AM | 47.7 | 6.2 | 87.1 | 8.4 | 2.9 | 65.1 | 47.0 | 10.0 | 78.7 | 76.0 | 6.0 | 92.1 |
|   | PM | 41.8 | 7.0 | 83.4 | 11.9 | 4.0 | 66.5 | 55.0 | 10.0 | 81.8 | 48.0 | 6.0 | 87.5 |
| 5 | AM | 78.0 | 7.4 | 90.5 | 13.5 | 5.4 | 59.8 | 59.0 | 10.0 | 83.1 | 100.0 | 5.0 | 95.0 |
|   | PM | 74.5 | 11.0 | 85.2 | 25.4 | 8.0 | 68.5 | 70.0 | 21.0 | 70.0 | 72.0 | 5.0 | 93.1 |
| 6 | AM | 30.9 | 6.7 | 78.4 | 15.5 | 4.6 | 70.4 | 60.0 | 18.0 | 70.0 | 39.0 | 5.0 | 87.2 |
|   | PM | 56.5 | 12.9 | 77.2 | 33.2 | 9.5 | 71.3 | 97.0 | 25.0 | 74.2 | 52.0 | 6.0 | 88.5 |
| 7 | AM | 46.2 | 8.8 | 80.9 | 31.7 | 6.9 | 78.1 | 75.0 | 15.0 | 80.0 | 37.0 | 7.0 | 81.1 |
|   | PM | 59.0 | 10.1 | 82.9 | 9.2 | 4.4 | 52.0 | 98.0 | 18.0 | 81.6 | 40.0 | 7.0 | 82.5 |
|   | Average | 59.4 | 9.9 | 83.8 | 20.1 | 6.7 | 66.4 | 69.7 | 17.4 | 75.7 | 64.6 | 6.2 | 89.4 |

TABLE 2

Composite Sample Testing 800 MLSS @ 20 Min. Contact Time

| | | Total BOD (mg/l) | | | Soluble BOD(mg/l) | | | Soluble COD(mg/l) | | | TSS (mg/l) | | |
|---|---|---|---|---|---|---|---|---|---|---|---|---|---|
| Day | *Time | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 54.2 | 8.2 | 84.9 | 9.2 | 4.4 | 52.0 | 71.0 | 17.0 | 76.1 | 72.0 | 11.0 | 84.7 |
|   | PM | 74.2 | 17.5 | 76.4 | 31.7 | 12.6 | 60.3 | 102.0 | 36.0 | 64.7 | 66.0 | 6.0 | 90.9 |
| 2 | AM | 33.7 | 11.4 | 66.1 | 12.2 | 6.2 | 49.6 | 41.0 | 13.0 | 68.3 | 54.0 | 6.0 | 88.9 |
|   | PM | 85.1 | 12.3 | 85.5 | 34.4 | 7.2 | 79.2 | 76.0 | 23.0 | 69.7 | 127.0 | 5.0 | 96.1 |
| 3 | AM | 43.2 | 12.1 | 72.0 | 21.1 | 2.0 | 90.5 | 49.0 | 16.0 | 67.3 | 55.0 | 12.0 | 78.2 |
|   | PM | 75.0 | 21.0 | 72.0 | 39.1 | 14.1 | 64.1 | 102.0 | 35.0 | 65.7 | 60.0 | 6.0 | 90.0 |
| 4 | AM | 36.0 | 8.7 | 75.8 | 17.6 | 8.2 | 53.3 | 47.0 | 17.0 | 63.8 | 43.0 | 5.0 | 88.4 |
|   | PM | 59.8 | 19.9 | 66.6 | 39.4 | 16.1 | 59.3 | 91.0 | 32.0 | 64.8 | 48.0 | 8.0 | 83.3 |
| 5 | AM | 76.6 | 28.2 | 63.2 | 53.1 | 23.0 | 56.7 | 136.0 | 52.0 | 61.8 | 54.0 | 7.0 | 87.0 |
|   | PM | 79.2 | 25.0 | 68.4 | 54.0 | 19.3 | 64.2 | 114.0 | 39.0 | 65.8 | 48.0 | 6.0 | 87.5 |
|   | Average | 61.7 | 16.4 | 73.1 | 31.2 | 11.3 | 62.9 | 82.9 | 28.0 | 66.8 | 62.7 | 7.2 | 87.5 |

TABLE 3

Composite Sample Testing 400 MLSS @ 20 Min. Contact Time

| | | Total BOD (mg/l) | | | Soluble BOD(mg/l) | | | Soluble COD(mg/l) | | | TSS (mg/l) | | |
|---|---|---|---|---|---|---|---|---|---|---|---|---|---|
| Day | *Time | Primary Effluent | Ballasted Floculation Effluent | Percent Removal | Primary Effluent | Ballasted Floculation Effluent | Percent Removal | Primary Effluent | Ballasted Floculation Effluent | Percent Removal | Primary Effluent | Ballasted Floculation Effluent | Percent Removal |
| 1 | AM | 88.3 | 39.5 | 55.3 | 56.9 | 31.0 | 45.5 | 119.0 | 51.0 | 57.1 | 44.0 | 10.0 | 77.3 |
|   | PM | 104.4 | 61.9 | 40.7 | 69.1 | 50.0 | 27.7 | 149.0 | 87.0 | 41.6 | 56.0 | 12.0 | 78.6 |
| 2 | AM | 144.5 | 86.6 | 40.1 | 108.3 | 70.2 | 35.2 | 177.0 | 119.0 | 32.8 | 57.0 | 5.0 | 91.2 |
|   | PM | 114.0 | 52.7 | 53.8 | 83.0 | 41.9 | 49.6 | 167.0 | 86.0 | 48.5 | 64.0 | 7.0 | 89.1 |
| 3 | AM | 104.8 | 56.9 | 45.7 | 71.8 | 50.9 | 29.1 | 163.0 | 83.0 | 49.1 | 66.0 | 5.0 | 92.4 |
|   | PM | 114.4 | 47.7 | 58.3 | 74.0 | 47.0 | 36.5 | 176.0 | 73.0 | 58.5 | 73.0 | 5.0 | 93.2 |
| 4 | AM | 116.5 | 49.6 | 57.4 | 81.3 | 41.6 | 48.8 | 161.0 | 67.0 | 58.4 | 53.0 | 7.0 | 86.8 |
|   | PM | 119.7 | 55.1 | 53.9 | 82.7 | 46.3 | 44.1 | 163.0 | 82.0 | 49.7 | 74.0 | 5.0 | 93.2 |
| 5 | AM | 90.1 | 40.0 | 55.6 | 67.5 | 32.1 | 52.5 | 147.0 | 57.0 | 61.2 | 51.0 | 5.0 | 90.2 |
|   | PM | 149.0 | 76.7 | 48.5 | 115.2 | 69.1 | 40.0 | 218.0 | 110.0 | 49.5 | 66.0 | 5.0 | 92.4 |
|   | Average | 114.6 | 56.7 | 50.9 | 81.0 | 48.0 | 40.9 | 164.0 | 81.5 | 50.6 | 60.4 | 6.6 | 88.4 |

TABLE 4

Composite Sample Testing 200 MLSS @ 30 Min. Contact Time

| Day | *Time | Total BOD (mg/l) Primary Effluent | Total BOD (mg/l) Ballasted Floculation Effluent | Total BOD (mg/l) Percent Removal | Soluble BOD (mg/l) Primary Effluent | Soluble BOD (mg/l) Ballasted Floculation Effluent | Soluble BOD (mg/l) Percent Removal | Soluble COD (mg/l) Primary Effluent | Soluble COD (mg/l) Ballasted Floculation Effluent | Soluble COD (mg/l) Percent Removal | TSS (mg/l) Primary Effluent | TSS (mg/l) Ballasted Floculation Effluent | TSS (mg/l) Percent Removal |
|---|---|---|---|---|---|---|---|---|---|---|---|---|---|
| 1 | AM | 43.3 | 10.3 | 76.1 | 14.6 | 8.3 | 43.3 | 47.0 | 11.0 | 76.6 | 78.0 | 5.0 | 93.6 |
|   | PM | 44.1 | 9.8 | 77.7 | 15.3 | 6.5 | 57.6 | 46.0 | 13.0 | 71.7 | 74.0 | 5.0 | 93.2 |
| 2 | AM | 21.1 | 6.2 | 70.4 | 8.1 | 3.7 | 54.1 | 45.0 | 10.0 | 77.8 | 31.0 | 5.0 | 83.9 |
|   | PM | 27.8 | 9.7 | 65.3 | 13.6 | 6.7 | 51.2 | 57.0 | 13.0 | 77.2 | 43.0 | 5.0 | 88.4 |
| 3 | AM | 40.3 | 12.0 | 70.2 | 17.4 | 9.1 | 48.0 | 63.0 | 19.0 | 69.8 | 47.0 | 5.0 | 89.4 |
|   | PM | 48.6 | 13.9 | 71.5 | 26.0 | 10.6 | 59.1 | 86.0 | 25.0 | 70.9 | 38.0 | 5.0 | 86.8 |
| 4 | AM | 42.6 | 9.9 | 76.7 | 31.1 | 9.4 | 69.8 | 77.0 | 23.0 | 70.1 | 34.0 | 5.0 | 85.3 |
|   | PM | 92.3 | 39.6 | 72.4 | 72.4 | 36.5 | 49.7 | 143.0 | 74.0 | 48.3 | 51.0 | 5.0 | 90.2 |
| 5 | AM | 42.6 | 15.5 | 63.6 | 25.1 | 13.1 | 47.7 | 67.0 | 25.0 | 62.7 | 63.0 | 5.0 | 92.1 |
|   | PM | 64.8 | 25.1 | 61.3 | 39.8 | 22.2 | 44.3 | 101.0 | 38.0 | 62.4 | 64.0 | 7.0 | 89.1 |
|   | Average | 46.7 | 15.2 | 70.5 | 26.4 | 12.6 | 52.5 | 73.2 | 25.1 | 68.8 | 52.3 | 5.2 | 89.2 |

TABLE 5

Composite Sample Testing 100 MLSS @ 30 Min. Contact Time

| Day | *Time | Total BOD (mg/l) Primary Effluent | Total BOD (mg/l) Ballasted Floculation Effluent | Total BOD (mg/l) Percent Removal | Soluble BOD (mg/l) Primary Effluent | Soluble BOD (mg/l) Ballasted Floculation Effluent | Soluble BOD (mg/l) Percent Removal | Soluble COD (mg/l) Primary Effluent | Soluble COD (mg/l) Ballasted Floculation Effluent | Soluble COD (mg/l) Percent Removal | TSS (mg/l) Primary Effluent | TSS (mg/l) Ballasted Floculation Effluent | TSS (mg/l) Percent Removal |
|---|---|---|---|---|---|---|---|---|---|---|---|---|---|
| 1 | AM | 78.0 | 43.0 | 44.9 | 57.7 | 36.0 | 37.6 | 107.0 | 59.0 | 44.9 | 64.0 | 8.0 | 87.5 |
|   | PM | 91.5 | 44.6 | 51.3 | 60.8 | 39.2 | 35.5 | 134.0 | 73.0 | 45.5 | 82.0 | 6.0 | 92.7 |
| 2 | AM | 45.5 | 26.0 | 42.9 | 30.2 | 22.6 | 25.3 | 68.0 | 39.0 | 42.6 | 40.0 | 6.0 | 85.0 |
|   | PM | 108.0 | 39.1 | 63.8 | 69.8 | 37.9 | 45.6 | 146.0 | 56.0 | 61.6 | 68.0 | 5.0 | 92.6 |
| 3 | AM | 29.9 | 7.4 | 75.2 | 10.5 | 5.1 | 51.7 | 60.0 | 12.0 | 80.0 | 37.0 | 5.0 | 86.5 |
|   | PM | 70.7 | 27.3 | 61.4 | 18.1 | 40.1 | −121.4 | 111.0 | 41.0 | 63.1 | 64.0 | 9.0 | 85.9 |
| 4 | AM | 43.5 | 18.6 | 57.2 | 20.4 | 14.3 | 29.6 | 82.0 | 27.0 | 67.1 | 48.0 | 5.0 | 89.6 |
|   | PM | 47.2 | 16.2 | 72.4 | 23.5 | 12.6 | 46.3 | 95.0 | 26.0 | 72.6 | 43.0 | 14.0 | 67.4 |
| 5 | AM | 52.2 | 14.9 | 71.5 | 15.7 | 11.2 | 28.8 | 65.0 | 33.0 | 49.2 | 58.0 | 5.0 | 91.4 |
|   | PM | 63.4 | 25.5 | 59.8 | 34.1 | 15.9 | 53.4 | 110.0 | 40.0 | 63.6 | 64.0 | 7.0 | 89.1 |
|   | Average | 63.0 | 26.3 | 60.0 | 34.1 | 23.5 | 39.3 | 97.8 | 40.6 | 59.0 | 56.8 | 7.0 | 86.8 |

TABLE 6

Composite Sample Testing 300 MLSS @ 30 Min. Contact Time

| Day | *Time | Total BOD (mg/l) Primary Effluent | Total BOD (mg/l) Ballasted Floculation Effluent | Total BOD (mg/l) Percent Removal | Soluble BOD (mg/l) Primary Effluent | Soluble BOD (mg/l) Ballasted Floculation Effluent | Soluble BOD (mg/l) Percent Removal | Soluble COD (mg/l) Primary Effluent | Soluble COD (mg/l) Ballasted Floculation Effluent | Soluble COD (mg/l) Percent Removal | TSS (mg/l) Primary Effluent | TSS (mg/l) Ballasted Floculation Effluent | TSS (mg/l) Percent Removal |
|---|---|---|---|---|---|---|---|---|---|---|---|---|---|
| 1 | AM | 78.9 | 27.4 | 65.2 | 27.5 | 23.9 | 13.3 | 80.0 | 43.0 | 46.3 | 100.0 | 5.0 | 95.0 |
|   | PM | 115.1 | 34.0 | 70.5 | 64.8 | 27.3 | 57.9 | 149.0 | 55.0 | 63.1 | 79.0 | 5.0 | 93.7 |
| 2 | AM | 58.8 | 30.8 | 47.6 | 30.8 | 26.3 | 14.6 | 80.0 | 42.0 | 47.5 | 67.0 | 5.0 | 92.5 |
|   | PM | 65.0 | 31.1 | 52.2 | 45.2 | 24.6 | 45.6 | 111.0 | 48.0 | 56.8 | 64.0 | 6.0 | 90.6 |
| 3 | AM | 60.8 | 24.3 | 60.0 | 31.6 | 21.7 | 31.5 | 89.0 | 47.0 | 47.2 | 92.0 | 5.0 | 94.6 |
|   | PM | 78.0 | 28.7 | 63.2 | 49.9 | 28.4 | 43.2 | 129.0 | 56.0 | 56.6 | 78.0 | 5.0 | 93.6 |
|   | Average | 76.1 | 29.4 | 59.8 | 41.6 | 25.3 | 34.3 | 106.3 | 48.5 | 52.9 | 80.0 | 5.2 | 93.3 |

From the foregoing discussion, it is seen where a ballasted flocculation system, with the addition of activated sludge, can be utilized to remove soluble BOD and suspended solids from a water or wastewater stream. In the case of the FIGS. 2 and 4 embodiments, it is seen that activated sludge can be introduced by utilizing either mixed liquor or activated sludge that is being returned from the clarifier to a reactor in an activated sludge process. Where the term activated sludge is utilized, it is meant to encompass any activated sludge no matter how concentrated and would include return activated sludge as well as mixed liquor.

The invention claimed is:

1. A wastewater treatment system, comprising:
   an activated sludge system including at least one reactor, a clarifier and a return activated sludge line for conveying return activated sludge from the clarifier to the reactor to form mixed liquor;
   a ballasted flocculation system having one or more tanks and a settling zone and disposed is a non-series relationship with the activated sludge system; and
   a mixed liquor supply line connected between the activated sludge system and the ballasted flocculation system for transferring at least a portion of the mixed liquor directly to the ballasted flocculation system.

2. A method of treating wastewater utilizing an activated sludge system and a ballasted flocculation system to remove soluble BOD from the wastewater being treated, the method comprising:
   directing the wastewater into and through an activated sludge system having at least one reactor and a clarifier;
   returning activated sludge from the clarifier to the reactor and mixing the activated sludge with the wastewater to form mixed liquor;
   directing a portion of the mixed liquor through the activated sludge system and to the clarifier where the clarifier produces a first clarified effluent;
   directing another portion of the mixed liquor from the activated sludge system to a ballasted flocculation system disposed in parallel relationship with the clarifier of the activated sludge system;
   directing the other portion of the mixed liquor through the ballasted flocculation system wherein the ballasted flocculation produces a second clarified effluent;
   wherein substantially all of the wastewater that forms a part of the mixed liquor that is treated in the ballasted flocculation passes through at least a part of the activated sludge system prior to entering the ballasted flocculation system; and
   wherein the clarifier of the activated sludge system and the ballasted flocculation system clarifies the wastewater being treated, and wherein the activated sludge that forms a part of the mixed liquor is effective to remove soluble BOD from the wastewater that forms a part of the mixed liquor that passes through both the activated sludge system and the ballasted flocculation system therein.

3. The method of claim 2 including producing sludge in the ballasted flocculation system and returning the produced sludge from the ballasted flocculation system to the activated sludge system.

4. The method of claim 3 wherein both the activated sludge produced in the activated sludge system and the sludge produced by the ballasted flocculation system are returned to at least one reactor in the activated sludge system and mixed with wastewater to form the mixed liquor.

5. A method of treating wastewater utilizing an activated sludge system and a ballasted flocculation system to clarify the wastewater and remove soluble BOO from the wastewater, the method comprising:
   directing substantially all the wastewater to be treated into an activated sludge system having at least one reactor and a clarifier;
   returning activated sludge from the clarifier to the reactor and mixing the activated sludge with the wastewater to form mixed liquor;
   directing a portion of the mixed liquor through the activated sludge system and to the clarifier where the clarifier produces a first clarified effluent;
   directing another portion of the mixed liquor from the activated sludge system to a ballasted flocculation system disposed in a non-series relationship with the activated sludge system;
   clarifying the other portion of the mixed liquor in the ballasted flocculation system to produce a second clarified effluent; and
   removing soluble BOD from the wastewater that passes through both the activated sludge system and the ballasted flocculation system.

6. The method of claim 5 including directing the other portion of the mixed liquor directly to the ballasted flocculation system.

7. The method of claim 5 wherein the other portion of mixed liquor is not mixed with other wastewater prior to entering the ballasted flocculation system.

8. The method of claim 5 wherein there is provided a mixed liquor line extending from the activated sludge system to the ballasted flocculation system and wherein the method entails directing the other portion of mixed liquor through the mixed liquor line into the ballasted flocculation system.

9. The method of claim 5 wherein substantially all of the wastewater to be treated is mixed with return activated sludge in the activated sludge system to form mixed liquor in the activated sludge system.

10. The method of claim 5 wherein the ballasted flocculation system includes at least one mixing tank and wherein the method entails directing the other portion of the mixed liquor directly to the mixing tank of the ballasted flocculation system.

11. The method of claim 10 wherein there is provided a line between the activated sludge system and the mixing tank of the ballasted flocculation system and wherein the method includes directing the other portion of the mixed liquor from the activated sludge system through the line to the mixing tank of the ballasted flocculation system.

12. The wastewater treatment system of claim 1 wherein the clarifier of the activated sludge system and the ballasted flocculation system are disposed in parallel relationship.

* * * * *